United States Patent
Pouet

(10) Patent No.: US 7,864,338 B2
(45) Date of Patent: Jan. 4, 2011

(54) INTERFEROMETRIC METHOD AND APPARATUS FOR LINEAR DETECTION OF MOTION FROM A SURFACE

(75) Inventor: Bruno Francois Pouet, Los Angeles, CA (US)

(73) Assignee: Bossa Nova Technologies, LLC, Venice, CA (US)

( * ) Notice: Subject to any disclaimer, the term of this patent is extended or adjusted under 35 U.S.C. 154(b) by 244 days.

(21) Appl. No.: 12/267,336

(22) Filed: Nov. 7, 2008

(65) Prior Publication Data

US 2009/0122322 A1    May 14, 2009

Related U.S. Application Data

(60) Provisional application No. 61/002,311, filed on Nov. 9, 2007.

(51) Int. Cl.
*G01B 11/02* (2006.01)
(52) U.S. Cl. .................................................... 356/502
(58) Field of Classification Search ................ 356/498, 356/502
See application file for complete search history.

(56) References Cited

U.S. PATENT DOCUMENTS

| | | | | |
|---|---|---|---|---|
| 3,700,903 A | * | 10/1972 | Adler et al. ............... | 250/222.1 |
| 4,633,715 A | * | 1/1987 | Monchalin .................... | 73/657 |
| 5,080,491 A | * | 1/1992 | Monchalin et al. .......... | 356/493 |
| 5,909,279 A | * | 6/1999 | Pepper et al. ............... | 356/479 |
| 6,795,191 B2 | * | 9/2004 | Barbehenn .................. | 356/445 |
| 7,652,773 B2 | * | 1/2010 | DiMarzio et al. ........... | 356/502 |
| 2006/0215175 A1 | * | 9/2006 | Yacoubian .................. | 356/502 |
| 2009/0122322 A1 | * | 5/2009 | Pouet ......................... | 356/497 |

* cited by examiner

*Primary Examiner*—Patrick J Connolly
(74) *Attorney, Agent, or Firm*—Osha Liang LLP

(57) ABSTRACT

An apparatus and a method for detecting surface motion of an object subject to ultrasound are disclosed. The method comprises generating a laser beam, dividing the laser beam into a reference beam and an object beam to be directed onto the surface, thereby producing a scattered object beam, introducing a frequency shift between the reference beam and the scattered object beam, wherein the frequency shift is smaller than the ultrasonic frequency, detecting the interference between the scattered object beam and the frequency shifted reference beam using a plurality of detecting elements to generate a plurality of electrical interference signals, wherein the electrical interference signals each comprise a wanted signal component indicative of the surface motion and a noise signal component, and processing the electrical interference signals to determine the surface motion of the object.

36 Claims, 13 Drawing Sheets

INTERFEROMETRIC METHOD AND APPARATUS FOR LINEAR DETECTION OF MOTION FROM A SURFACE

BACKGROUND OF INVENTION

1. Field of the Invention

The present invention relates generally to interferometric systems and methods for detection of small transient surface motion and particularly for detection of very small transient surface motion of an object subjected to ultrasound.

2. Background Art

Interferometry is a well known technique for measuring the phase difference between two or more optical beams. Two-beam interferometers, where one of the optical beams is back reflected by an object surface and the other beam is used as a reference, are used to monitor small deformations on an object or workpiece under test or small displacements of a surface of an object or workpiece under test. Laser ultrasonics can advantageously be used for nondestructive testing in order to measure the thickness of objects or to monitor defects in materials. When industrial applications involve the inspection of an optically rough surface, the ultrasonic information is encoded in a laser beam with speckles.

For detection on optically rough surfaces, the optical sensor must be able to efficiently process the back reflected speckled light. Three different types of interferometers have been previously proposed and developed to efficiently process speckled light for detection of small transient ultrasonic signals: confocal Fabry-Perot interferometers (CFP), adaptive interferometers based on two-wave mixing in photorefractive crystals (TWM), and Multi-channel random-quadrature (MCRQ) interferometers.

With the CFP and TWM interferometers, processing the speckles is carried out optically, and a single photodetector is then used to detect the demodulated signal. With the recently developed MRCQ interferometer, as described in U.S. patent application Ser. No. 10/583,954, processing the multiple speckles is carried out electronically using an array of photodetectors instead of a single photodetector. Each detector element of the array is optimized for single-speckle detection. As shown in FIG. 1, the MRCQ interferometer 10 comprises a laser source 12 that is adapted to generate a laser beam 14 of a given intensity. The laser beam 14 is split into an object beam 16 and a reference beam 18 using a first beam splitter 20. The object beam 16 is then directed onto a scattering surface of an object 24 subjected to ultrasound using an optical lens 26. The back-scattered light 28 is collected by the lens 26, thus generating a scattered object beam 30. The reference beam 18 is expanded by means of a beam expander 32, and directed by means of mirrors 31, 35. The reference beam 18 and the scattered object beam 30 are then combined using a second beam splitter 33, thus forming two interference beams 34, 36. The two interference beams 34, 36 are each received by two detector arrays 38, 39, respectively, and converted into electrical interference signals, which are processed by a parallel processing circuit 40.

The phases of the portions of the interference beam arriving at the detector elements are random and not correlated with each other due to the speckled interference beam that results from a rough surface of the object whose displacement is measured. Thus, every detector of the detector array 38, 39 receives another speckle pattern with random and non-correlated phases. A processing circuit used with the MRCQ interferometer is also described in U.S. patent application Ser. No. 10/583,954 and shown in FIG. 2. The processing circuit is used to carry out electronic parallel signal processing based on signal rectification, i.e., on the rectification of the amplitude of a sinusoidal signal. The processing circuit is used to generate an output signal proportional to the rectified displacement of the workpiece surface.

As an example, FIG. 3 shows the response of a multi-channel random-quadrature interferometer using a signal rectification-demodulation scheme. The interferometer output noise level is about 40 mV (rms). For measurement values (corresponding to a displacement of an object) above the noise level, the interferometer response is proportional to the absolute value of the displacement, i.e., the response is linear. For measurement values near or below the noise level, the rectification process does not effectively rectify the signals and the output amplitude is lower than the amplitude expected for a response proportional to the absolute value of displacement.

Furthermore, also for signals with ultrasonic frequencies of more than a few tens of MHz, demodulation based on signal rectification is no longer efficient. With increasing detection bandwidths, the noise amplitude also increases and the signal is often of smaller amplitude.

Thus, the rectification-demodulation is strongly influenced by the noise amplitude. The noise superimposes a DC offset to the signal, which degrades the rectification process.

Linear-demodulation for detection of signals at high ultrasonic frequency or of very small amplitude is proposed to overcome the above mentioned limitations.

SUMMARY OF INVENTION

In a first aspect, the present disclosure relates to a method for detecting surface motion of an object subject to ultrasound. The method comprises generating a laser beam, dividing the laser beam into a reference beam and an object beam to be directed onto the surface, thereby producing a scattered object beam, introducing a frequency shift between the reference beam and the scattered object beam, wherein the frequency shift is smaller than the ultrasonic frequency, detecting the interference between the scattered object beam and the frequency shifted reference beam using a plurality of detecting elements to generate a plurality of electrical interference signals, wherein the electrical interference signals each comprise a wanted signal component indicative of the surface motion and a noise signal component, and processing the electrical interference signals to determine the surface motion of the object.

In a second aspect, the present disclosure relates to a method for detecting surface motion of an object subject to ultrasound. The method comprises generating a laser beam, dividing the laser beam into a reference beam and an object beam to be directed onto the surface, wherein the normal on the surface of the object has an angle with the object beam, thereby producing a frequency shifted scattered object beam, wherein the frequency shift is smaller than the ultrasonic frequency, wherein the object is in transverse motion with respect to the object beam, detecting the interference between the scattered object beam and the frequency shifted reference beam using a plurality of detecting elements to generate a plurality of electrical interference signals, wherein the electrical interference signals each comprise a wanted signal component indicative of the surface motion and a noise signal component, and processing the electrical interference signals to determine the surface motion of the object.

In a third aspect, the present disclosure relates to a laser interferometric apparatus for detecting surface motion of an object subject to ultrasound. The apparatus comprises a laser source for producing a laser beam, a beam splitter for dividing the laser beam into a reference beam and an object beam to be directed onto the surface, thereby producing a scattered object beam, a frequency shifting element for introducing a frequency shift between the reference beam and the scattered object beam, wherein the frequency shift is smaller than the ultrasonic frequency, a detector with a plurality of detector elements for detecting the interference between the scattered object beam and the reference beam, resulting in a plurality of electrical interference signals each comprising a wanted signal component indicative of the surface motion and a noise signal component, and a processing unit for determining the surface motion of the object from the plurality of electrical interference signals.

In a fourth aspect, the present disclosure relates to a laser interferometric apparatus for detecting surface motion of an object subject to ultrasound. The apparatus comprises a laser source for producing a laser beam, a beam splitter for dividing the laser beam into a reference beam and an object beam to be directed onto the object/surface, wherein the normal on the surface of the object has an angle with the object beam, thereby producing a frequency shifted scattered object beam, wherein the frequency shift is smaller than the ultrasonic frequency, wherein the object is in transverse motion with respect to the object beam, a detector for detecting the interference between the scattered object beam and the reference beam, resulting in a plurality of electrical interference signals each comprising a wanted signal component indicative of the surface motion and a noise signal component, the electrical interference signals each defining a channel, and a processing unit for determining the surface motion of the object from the plurality of electrical interference signals.

Other aspects, characteristics, and advantages of the invention will be apparent from the following detailed description.

DETAILED DESCRIPTION

Figure 1:
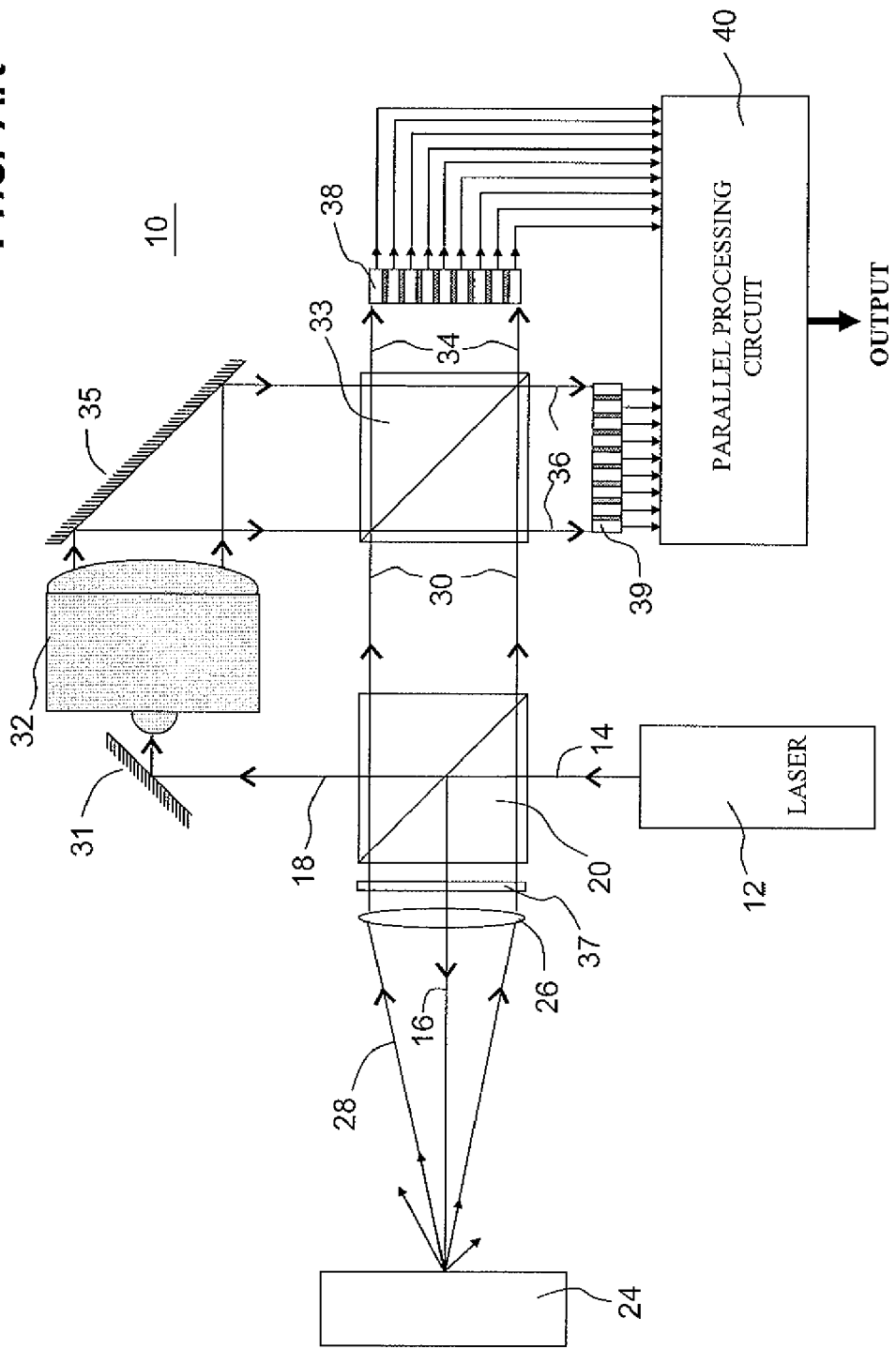
FIG. 1 shows a prior art multi-channel laser interferometer.
Figure 2:
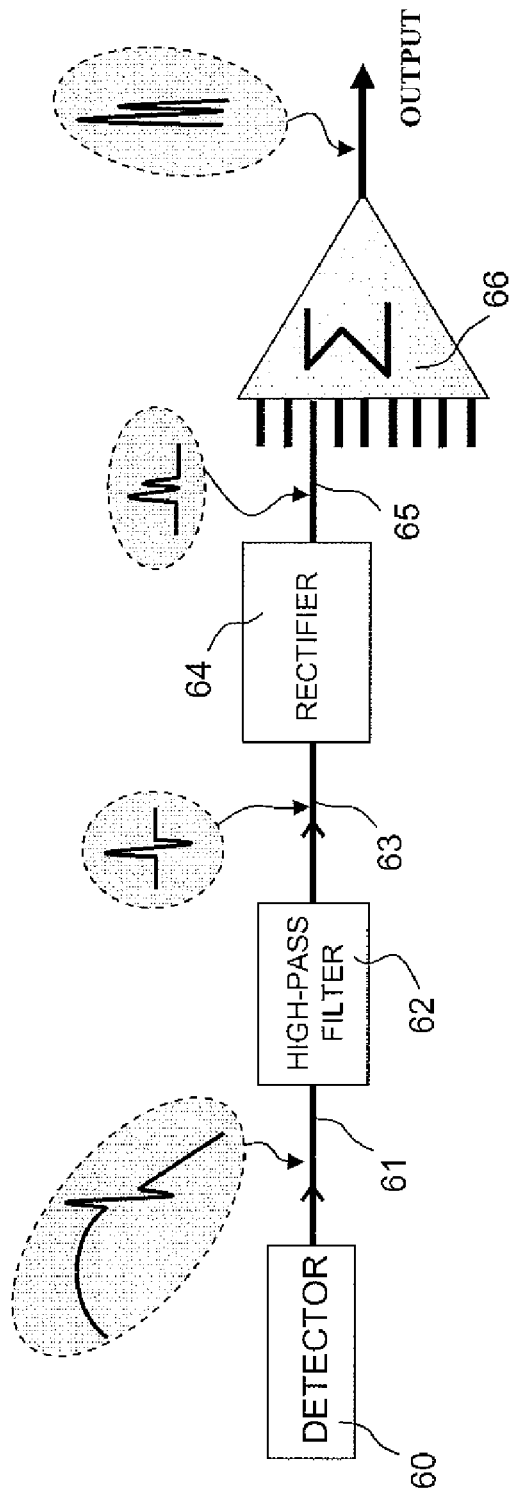
FIG. 2 schematically shows a prior art processing circuit.
Figure 3:
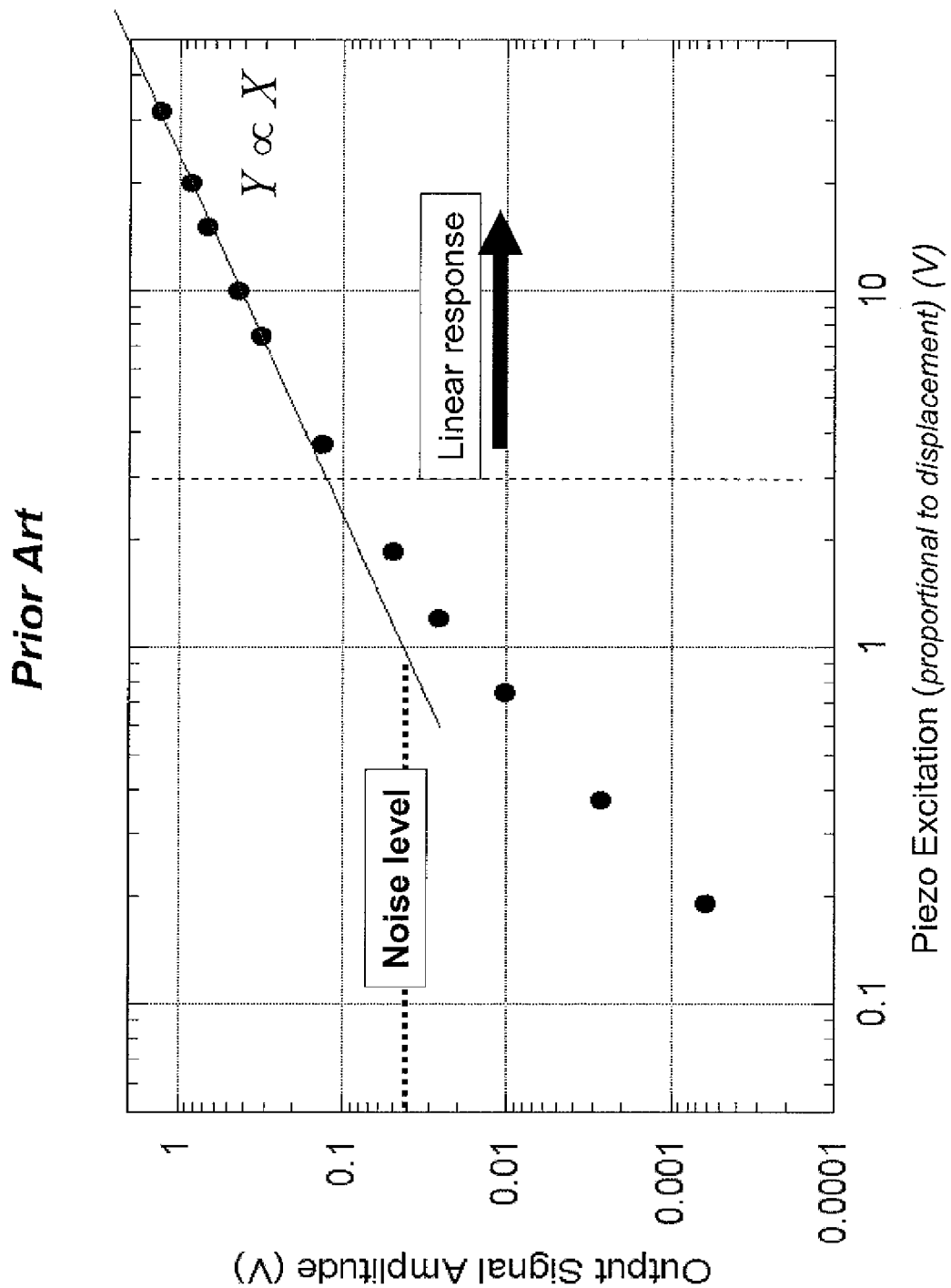
FIG. 3 shows the response of the interferometer of FIG. 1 used with the processing circuit of FIG. 2.

Specific embodiments of the present disclosure will now be described in detail with reference to the accompanying Figures. Like elements in the various Figures are denoted by like reference numerals for consistency.

In general, embodiments of the present disclosure relate to apparatus and methods for detecting very small surface motion of an object subject to ultrasound. More specifically, embodiments of the present disclosure provide methods and apparatus for obtaining output signals from a multi-speckle random-quadrature (MRCQ) interferometer that are proportional to the small transient surface motion.

We will describe methods and apparatus for detection of very small signals in interferometers enabling linear signal demodulation. This is achieved by using a small frequency shift or a Doppler shift in one of the interferometer arms and by synchronizing the detection to this applied frequency/Doppler shift.

Figure 4A:
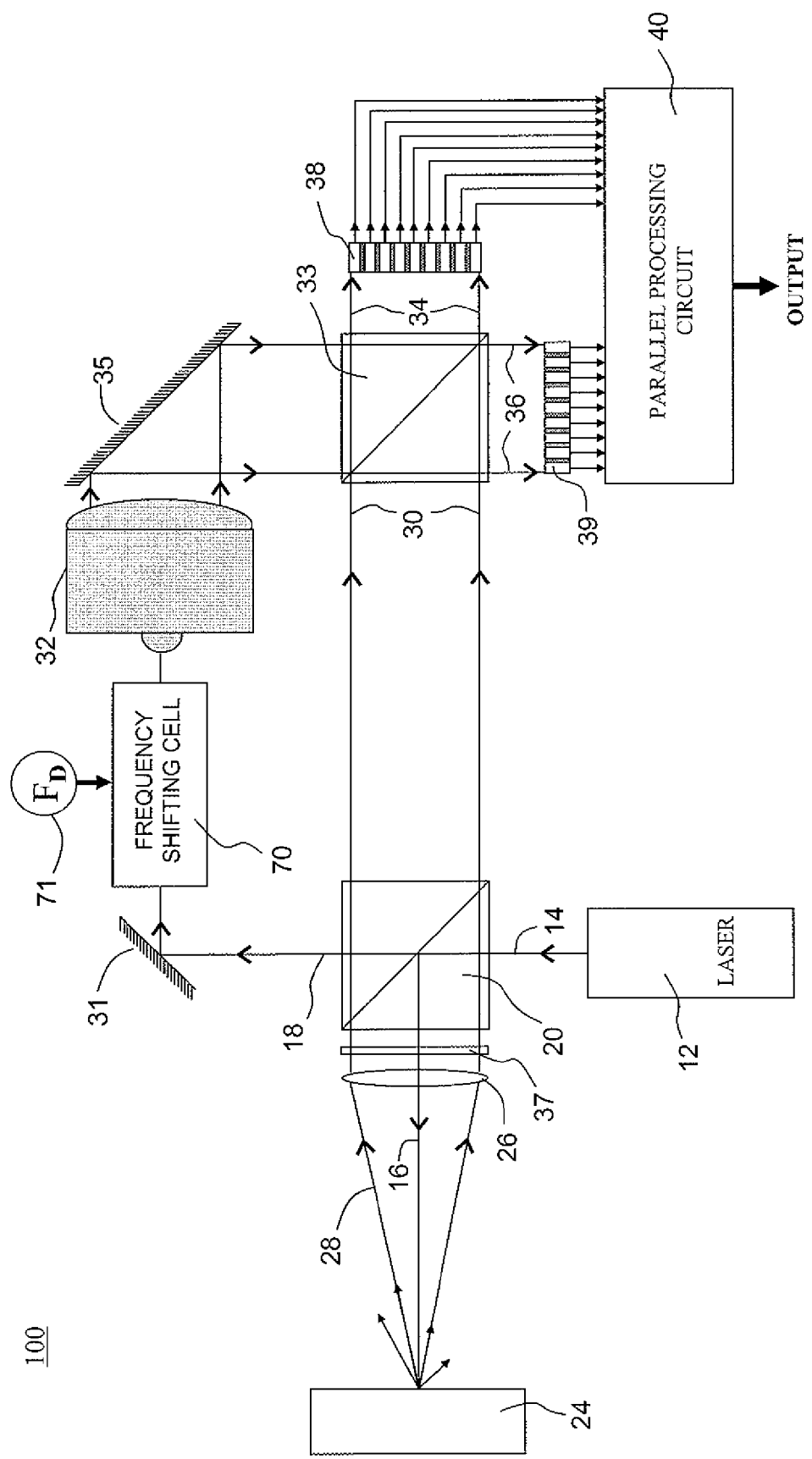
FIGS. 4A and 4B show variants of an interferometric apparatus according to a first preferred embodiment disclosed herein.

FIG. 4A shows an interferometric apparatus 100 according to a first preferred embodiment of the present disclosure. The optical setup of this embodiment presents elements that are similar to the ones shown in FIG. 1. For the sake of conciseness, these elements are not described in detail again.

According to this embodiment, a low frequency shift $f_D$ 71 is introduced into the reference beam 18 by a frequency shifting cell 70. Examples of frequency shifting cells include, but are not limited to, acousto-optic modulators. For example, a combination of two acousto-optic modulators operating at different frequencies may be used in order to obtain the required low frequency shift from the difference of the modulator frequencies. Preferably, the frequency shift $f_D$ 71 is below the frequencies of the small ultrasonic displacement to be measured and above perturbations due to ambient noise. Ambient noise frequencies are typically smaller than around 10 kHz. For example, the ultrasonic frequency may be around 100 kHz. Generally, the frequency shift $f_D$ will be between around 1 kHz and 1 MHz and may preferably be selected to be smaller than around 100 kHz and greater than around 10 kHz.

Figure 4B:
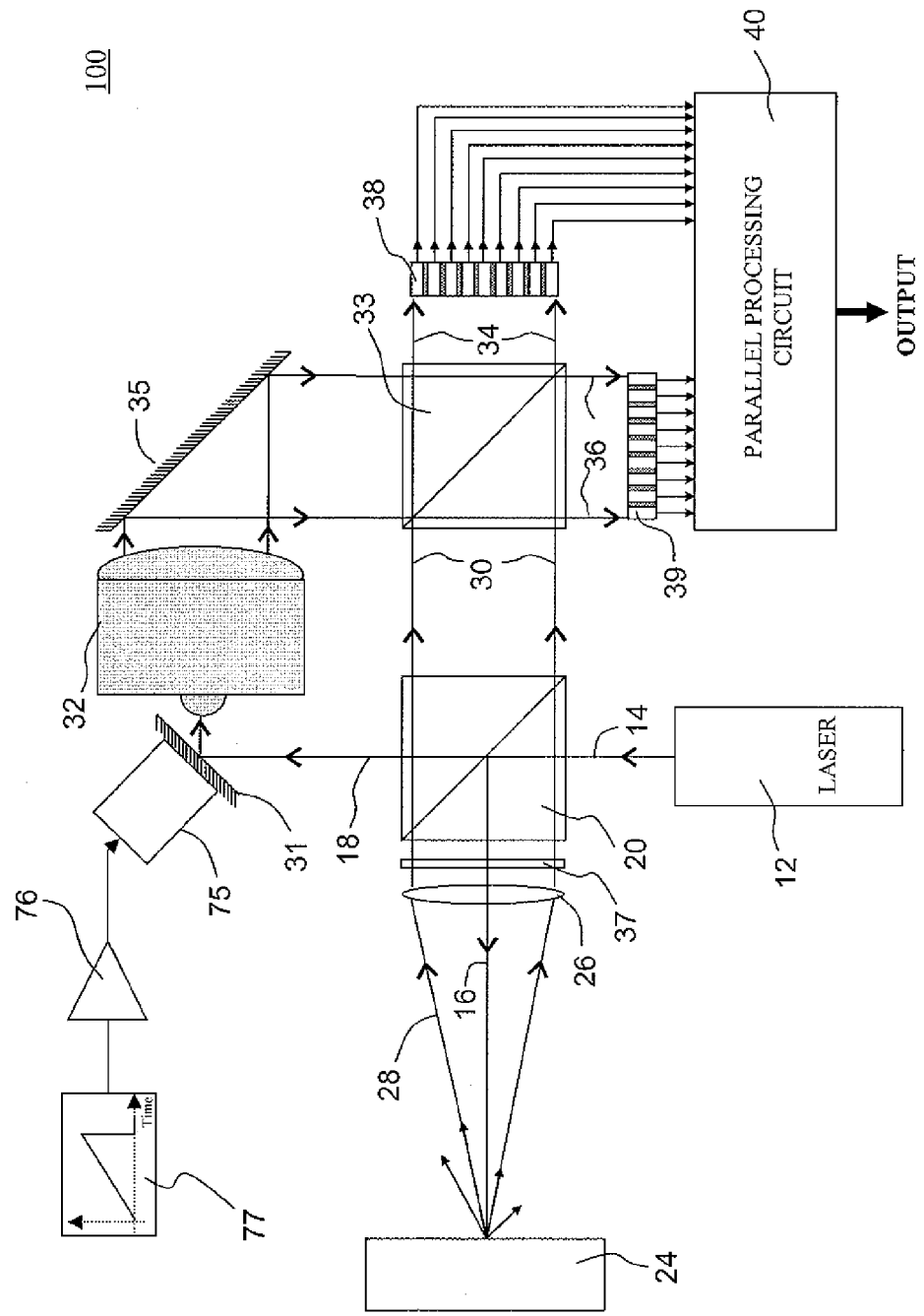

FIG. 4B shows a variant of the first preferred embodiment shown in FIG. 4A. Here, the frequency shift $f_D$ of the reference beam 18 is achieved by mounting the mirror 31 on a piezo translator 75. A ramp signal 77 is applied to the piezo translator 75, thereby displacing the mirror 31 at a constant velocity for the duration of the ramp. This results in a frequency shift through the Doppler effect. The ramp signal 77 may be amplified by a power amplifier 76 before being applied to the piezo translator. Because the piezo translator has a finite range a displacement, the ramp signal must be synchronized with the small ultrasonic displacement of interest. For example, the ultrasonic signal may be generated by either pulsed piezo transducer or with a pulsed laser. The ramp signal needs then to be synchronized with the generating pulse.

According to another variant of the first preferred embodiment, the first beam splitter 20 is a polarizing beam splitter, dividing the laser beam 14 into two orthogonally linearly polarized object and reference beams 16, 18. A quarter-wave plate 37, as shown in FIGS. 4A and AB, is disposed between the polarizing beam splitter 20 and the lens 26, the quarter-wave plate 37 having its optical axis oriented at 45° to the polarization axis of the object beam 16. Then, the scattered object beam 30, when incident on the polarizing beam splitter 20, has a linear or slightly elliptical polarization whose axis is orthogonal to that of the object beam reflected from the polarizing beam splitter 20. The linearly polarized scattered object beam 30 will mostly propagate straight through the polarizing beam splitter 20, and only a small part of the scattered object beam 30 will be reflected back to the laser source 12. Thus, the efficiency of the laser interferometric apparatus 10 is enhanced because most of the available laser light is used for the measurement.

Figure 5:
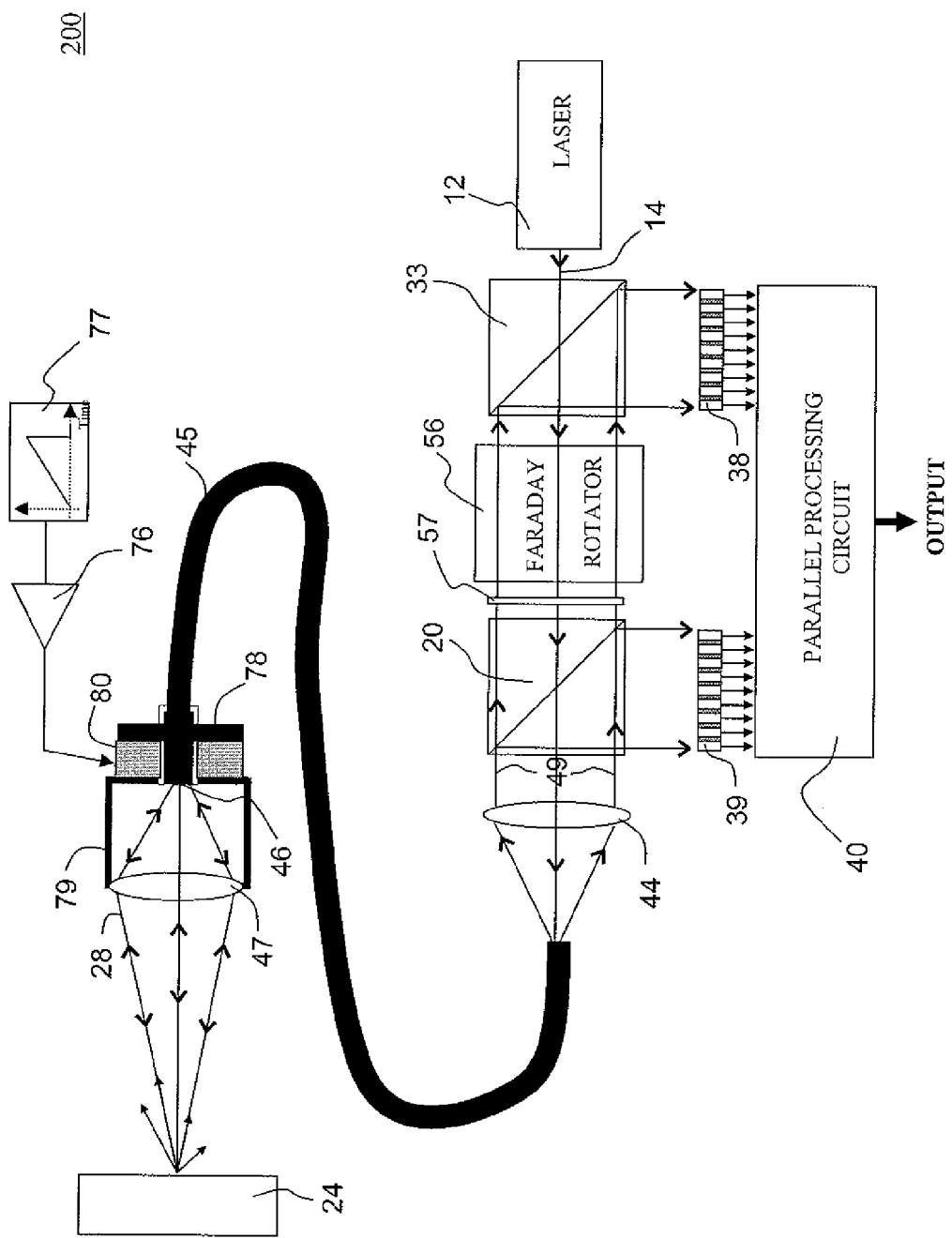
FIG. 5 shows an interferometric apparatus according to a second preferred embodiment disclosed herein.

FIG. 5 shows the interferometric apparatus 200 according to a second preferred embodiment of the present disclosure. In this embodiment, the object beam is frequency shifted using the Doppler effect. The apparatus 200 comprises a multimode fiber 45 to deliver the laser beam 14 onto the object 24. A large aperture lens 44 is used to couple the laser beam 14 into the multi-mode fiber 45. The multimode fiber end 46 is attached to one side of a piezo cylinder 80 using a fiber connector 78. The other side of the piezo cylinder 80 is attached to optical assembly 79. The optical assembly 79 comprises a lens 47. By applying an electric signal to the piezo cylinder 80, the cylinder length varies, resulting in variation of the object path between the lens 47 and the fiber end 46. Similarly to the variant of the first preferred embodiment shown in FIG. 4B, applying a ramp signal 77 to the piezo cylinder 80 induces motion of the fiber end 46 with constant velocity. This results in a Doppler shift of the laser beam exiting the fiber end 46, i.e., the object beam. The ramp signal 77 may be amplified by a power amplifier 76 before being applied to the piezo cylinder. The Doppler shifted object beam is focused by means of the lens 47 onto the surface of the object 24. The scattered object beam 28 is then focused back into the multi-mode fiber 45. A fraction of the laser beam is also back reflected by the partially reflective fiber end 46, thereby generating a reference beam. The reference beam and the object beam are combined during the back propagation in the multi-mode optical fiber 45 for generating an optical interference signal 49. The optical interference signal 49 exiting the optical fiber is then focused by means of the lens 44 onto an array of detectors 39. The portions of the interference beam received by elements of the detector array 39 are converted into electrical interference signals, which are processed by parallel processing circuitry 40.

As the person skilled in the art will appreciate, other systems than the piezo cylinder 80 attached to the fiber end 46 to induce motion of the fiber end 46 may be implemented with the interferometric apparatus 200 according to embodiments disclosed herein. For example, a voice coil system may be used to induce back and forth motion of the fiber end 46 with respect to the object 24.

A Cassegrain optical system (not shown) comprising a reflector and a large aperture lens may also be used to couple the laser beam 14 into the multi-mode fiber 45. The reflector may be, for example, a small mirror or a prism.

Still referring to FIG. 5, the interferometer apparatus may include a first and second array of detectors 39, 38, making use of all the light available. The laser beam 14 passes through a polarizing beam splitter 33, a Faraday rotator 56, and a half-wave plate 57, which is used to keep the polarization of laser beam 14 horizontal, and then passes through a second polarizing beam splitter 20. The large aperture lens 44 is used to couple the laser beam 14 into the multi-mode fiber 45. The vertically polarized component of the optical interference signal 49 exiting the multi-mode optical fiber 45 is then reflected by the second polarizing beam splitter 20 onto the first array of detectors 39. The horizontally polarized component of the optical interference signal 49 passes back through half-wave plate 57 and the Faraday rotator 56. The polarization of the horizontally polarized component of the optical interference signal 49 is thus rotated to vertical polarization, and the component is reflected by the polarizing beam splitter 33 onto the second array of detectors 38.

The Faraday rotator 56 and the polarizing beam splitter 55 form an optical isolator, which offers protection for the laser and thus avoids any possible laser instability caused by laser light being back-reflected into the laser. The Faraday rotator 56 also maximizes the sensitivity of the apparatus by allowing to separate and independently detect the horizontal and the vertical polarization components of the optical interference signal 49, which exhibits scrambled polarization.

Figure 6:
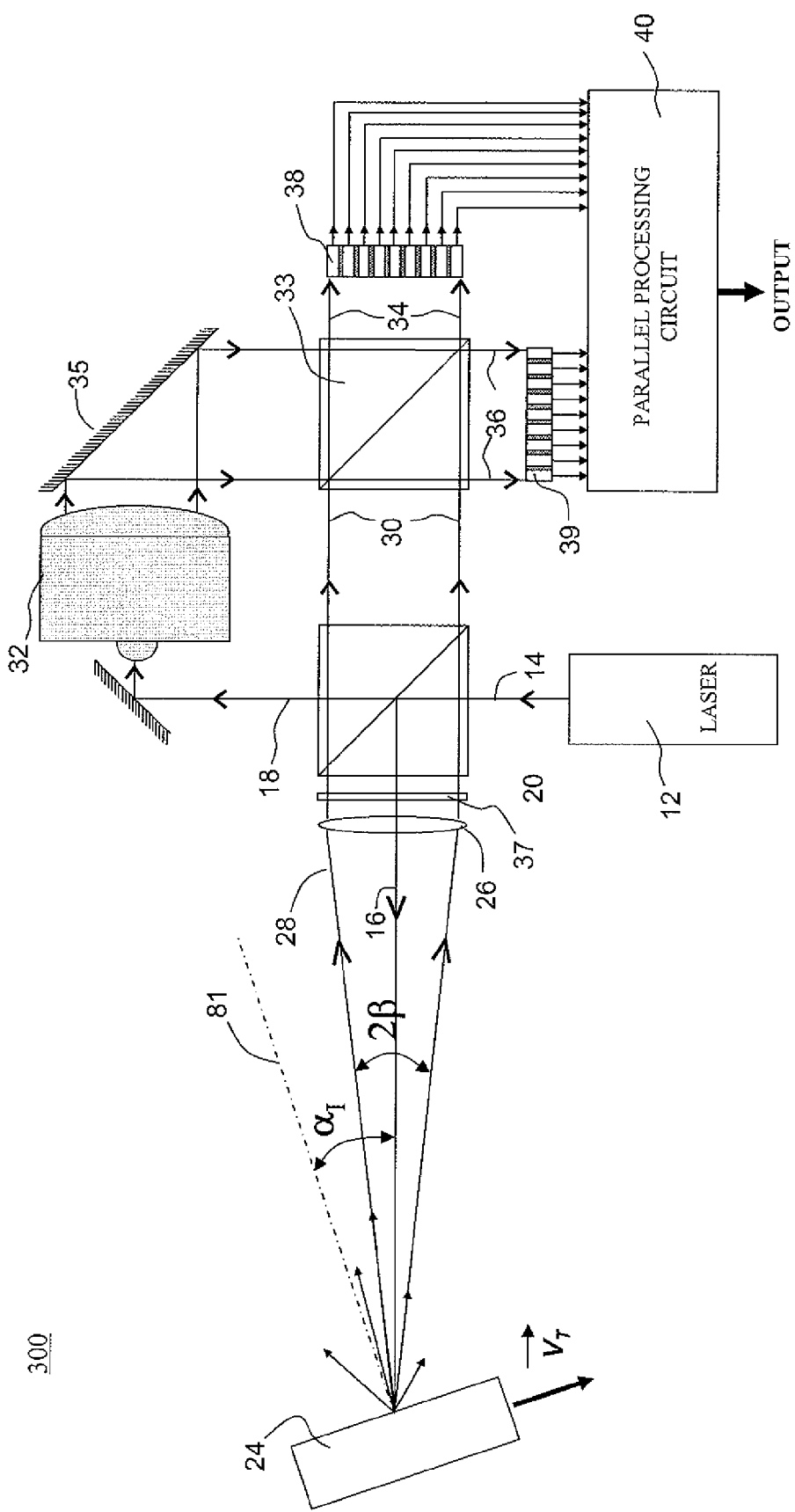
FIG. 6 shows an interferometric apparatus according to a third preferred embodiment disclosed herein.

FIG. 6 shows the interferometric apparatus 300 according to a third preferred embodiment of the present disclosure. The apparatus 300 is similar to the apparatus 100 according to the first preferred embodiment, as shown in FIGS. 4A and 4B. In this embodiment, the object 24 is arranged to be in motion with a motion velocity $V_T$, which is transverse with respect to the direction of observation, i.e., the direction of the object beam 16 falling onto the object. With a moving object, a Doppler shift of the back-scattered object beam 28 occurs if the object beam 16 is directed onto the surface of the object 24 with an incidence angle $\alpha_I$ between the object beam 16 and the surface normal 81 on the object's surface. The back-scattered light 28 is collected by optical lens 26, having a collection angle $2\beta$. The angular dependency of the Doppler shift $f_D$ is $$f_D = 2 \cdot \frac{V_T}{\lambda} \cdot \sin\left(\frac{\alpha_I \pm \beta}{2}\right) \cdot \cos\left(\frac{\alpha_I \pm \beta}{2}\right),$$

wherein $\lambda$ is the wavelength of the laser light.

The sign $\pm$ in the above equation accounts for slightly different detection angles for the detector elements of on detector array. In addition, if, for example, the surface of the object is not flat, the surface normal changes its direction depending on the location of the object when it moves by the interferometric apparatus. Thus, the incidence angle $\alpha_I$ varies, which leads to variations in the Doppler shift. If the corresponding frequency shift $f_D(\alpha_I)$ is still in the preferred frequency range as described above, the operation principle of the interferometric apparatus 300 according to embodiments disclosed herein is not affected.

As will be understood by the skilled person, in the interferometric apparatus of FIGS. 4-6 according to embodiments disclosed herein, only one of the interference beams 34, 36 could be used. Thus, only one of the arrays of detectors 38, 39 would be necessary. However, it is advantageous to use the two interference beams 34, 36 in order to increase the sensitivity and the efficiency of the interferometric apparatus 10. In variants of the present disclosure, the two interference beams 34, 36 are used. In other variants, one of the interference beams 34, 36 is blocked, and only one interference beam is used.

Figure 7:
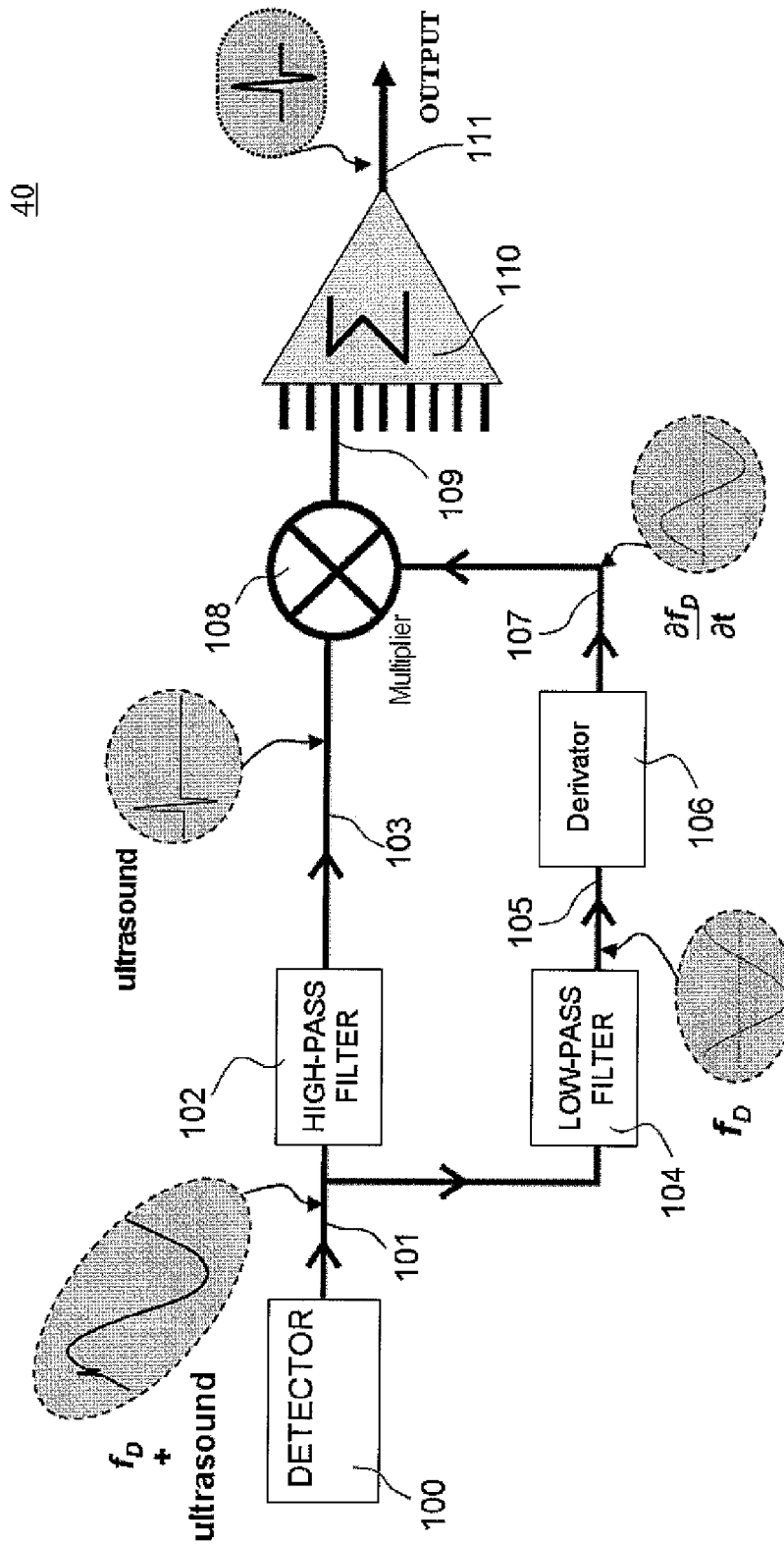
FIGS. 7, 8, and 9 shows a processing circuit for interferometric apparatus according to embodiments disclosed herein.
Figure 8:
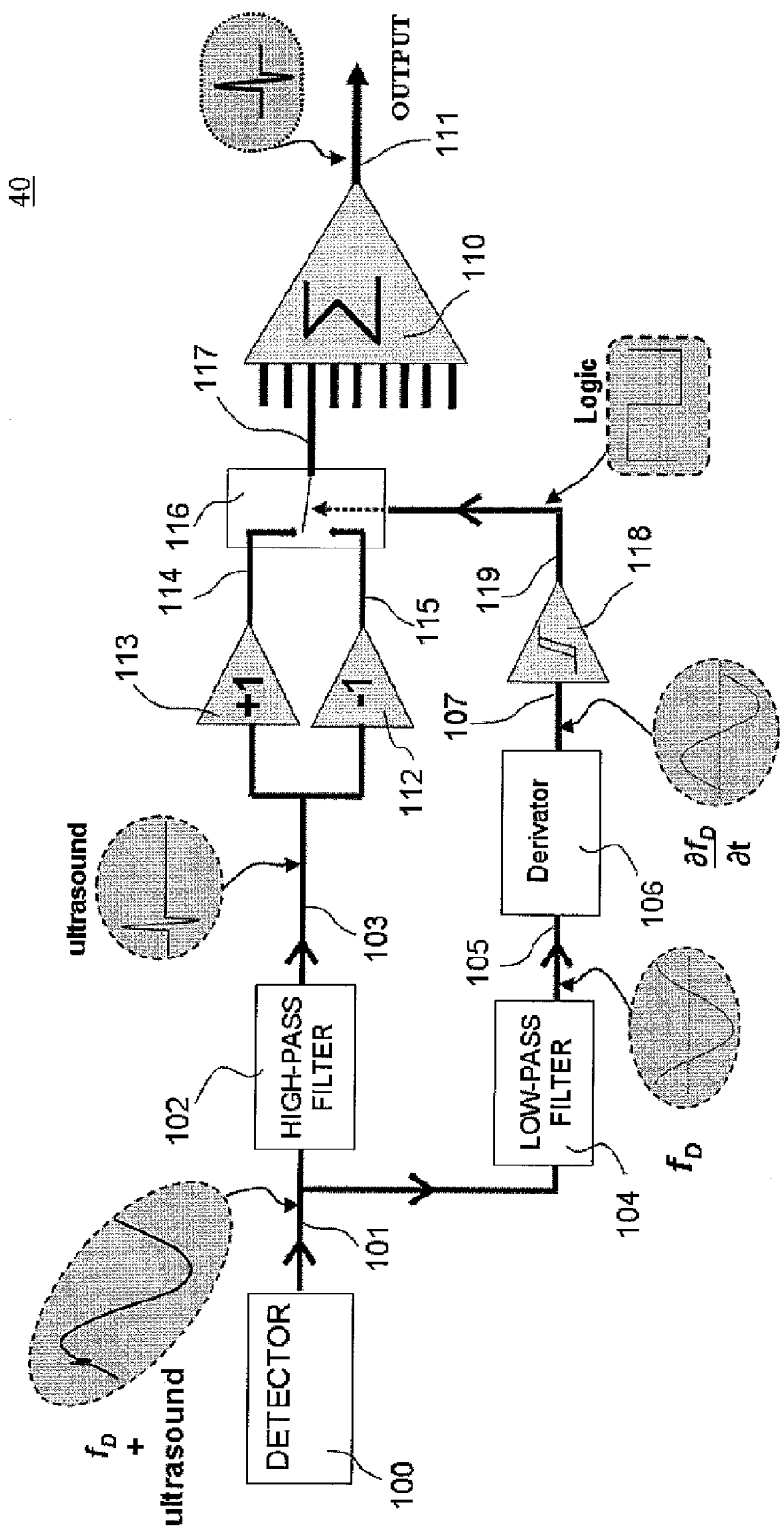
Figure 9:
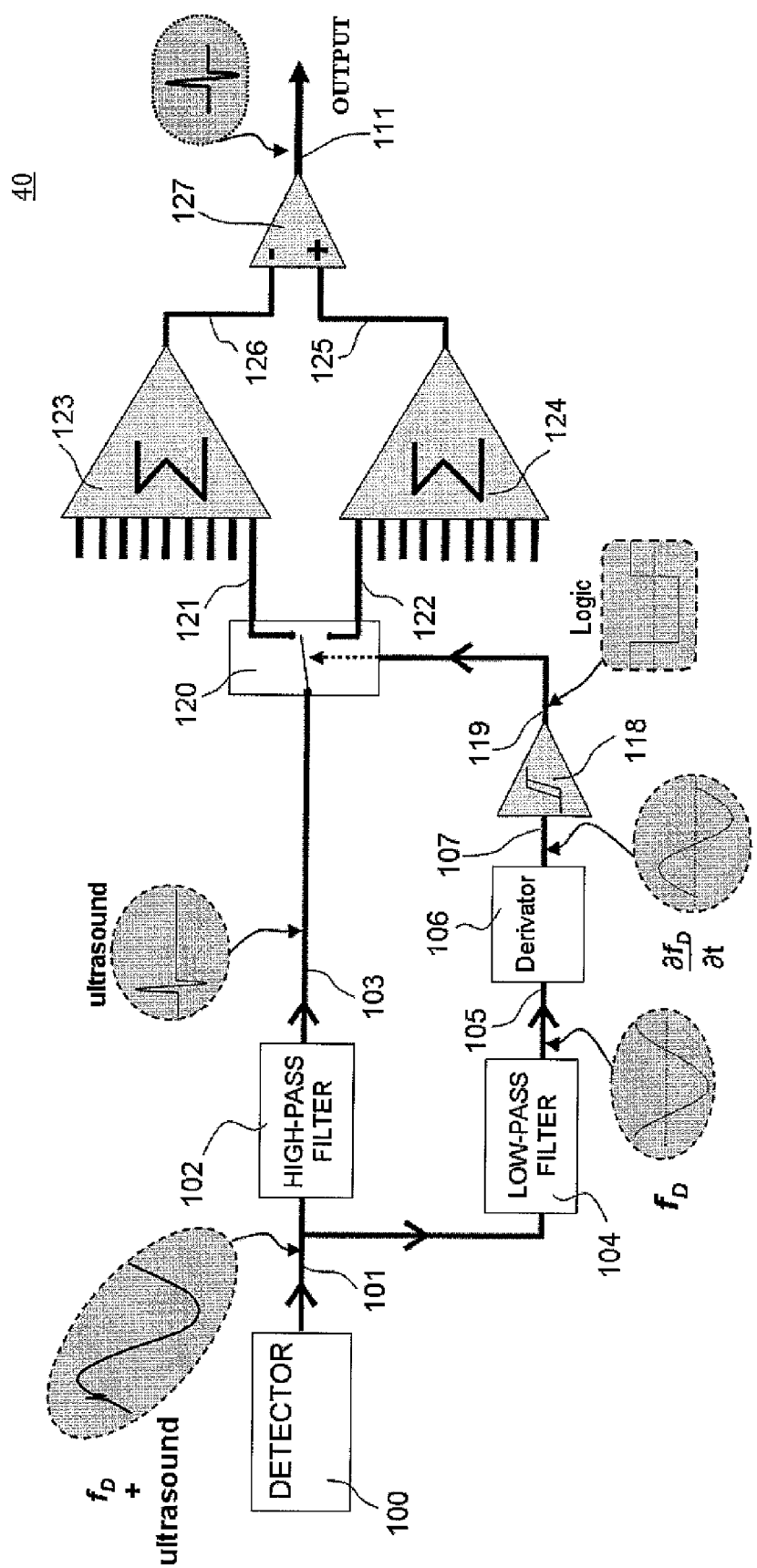

Referring now to FIGS. 7, 8, and 9, three embodiments of the processing circuit 40 according to the present disclosure are shown. The processing circuit 40 according to embodiments disclosed herein is adapted for linear demodulation of electrical interference signals provided by the detector arrays of the interferometer apparatus. As such, the processing circuit 40 is adapted for generating a strong linear displacement signal by electronically correcting the sign of the interferometer transfer function. The sign correction of the transfer function is achieved by "lock-in" on the low frequency shift introduced into the interference signal according to the embodiments of the interferometric apparatus described in FIGS. 4A, 4B, 5 and 6. In FIGS. 7, 8, and 9, the processing scheme for only one detection channel is shown, i.e., for one electrical interference signal 101 originating from one detector element 129 of the detector array.

FIG. 7 illustrates the processing circuit 40 according to a first preferred embodiment of the present disclosure, in which the sign correction is performed with analog circuitry. The electrical interference signal 101 is split in two signals: a high-frequency electrical signal 103 and a low-frequency electrical signal 105. After high-pass filter 102, the low frequency components of the electrical interference signal 101 are removed, keeping only the high-frequency small-amplitude ultrasonic signal. After low-pass filter 104, the high frequency components of electrical interference signal 101 are removed, keeping only the low-frequency background noise and the Doppler shift. The low-frequency electrical signal 105 is dominated by the Doppler frequency shift and will be referred to as Doppler signal 105. The Doppler signal 105 passes through a derivator circuit 106, providing a time-derivative Doppler signal 107, which is multiplied with the high-frequency signal 103 by an analog mixer 108. The resulting multiplied signal 109 and the other multiplied signals originating from the other channels, i.e. the other detector elements of the detector array (for example, reference 38 in FIG. 4A) then enter a summing amplifier 110, where they are added to produce an average output signal 111. The average output signal 111 is proportional to the small ultrasonic signal of interest, as will be explained in detail now.

Figure 10:
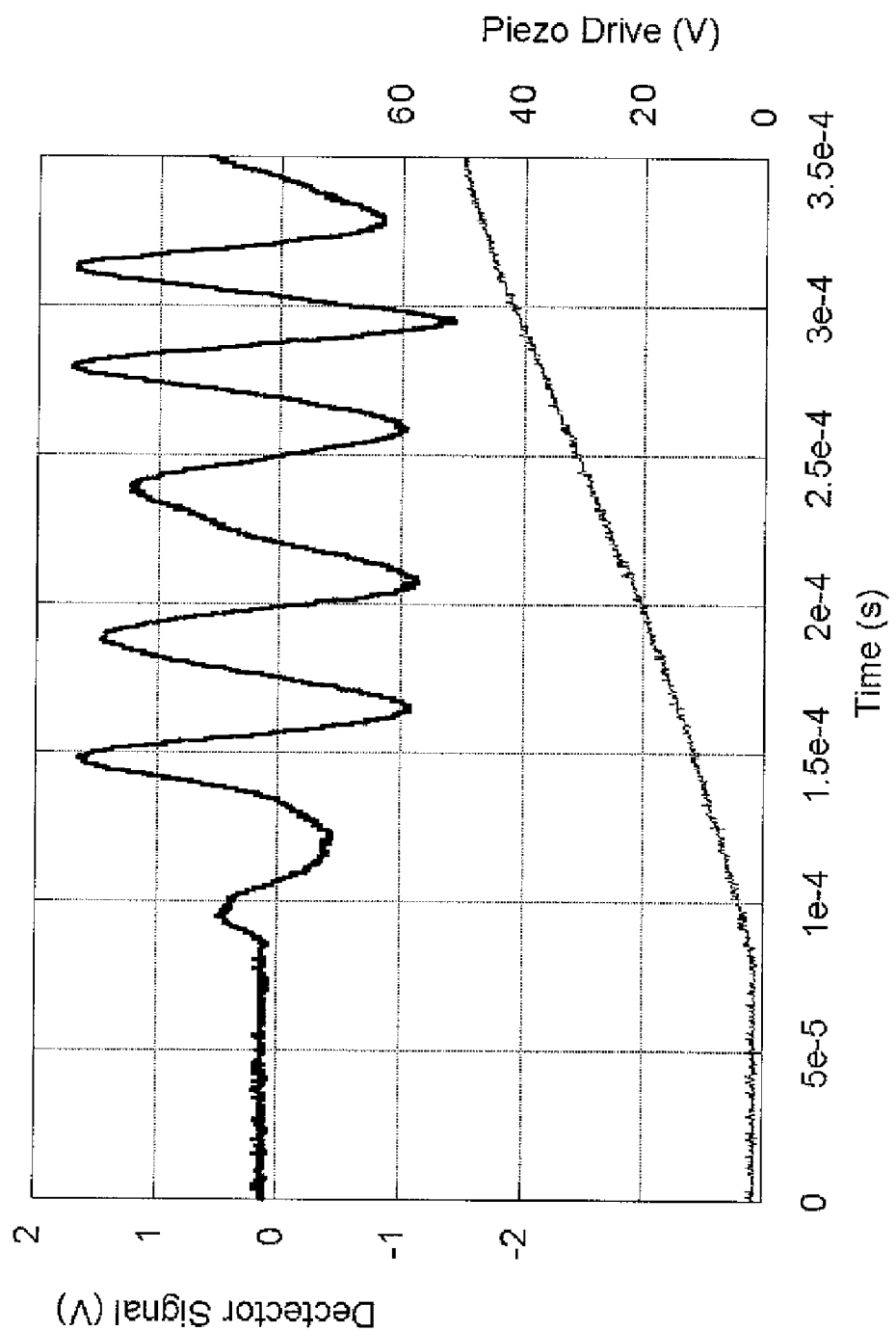
FIG. 10 shows a single electrical interference signal of the interferometric apparatus before signal processing according to embodiments disclosed herein.

The electrical interference signal from a detector element n of a detector array may be written as $$V_D(n) \propto I_{ref} + 2\sqrt{I_{obj(n)}I_{ref}} \cos[\varphi_{LF}(t,n) + 2\pi f_D t + \varphi_{UT}(t)] \quad (1)$$

where $f_D$ is the applied Doppler frequency shift, $\varphi_{UT}(t)$ is the small-amplitude and high-frequency phase variation induced by ultrasound, and $\varphi_{LF}(t)$ is the low frequency component of the phase (including the random speckle phase distribution and dependent on ambient noise), which fluctuates between 0 and $2\pi$. $I_{obj(n)}$ and $I_{ref}$ correspond to the intensities of the scattered object beam and the reference beam, respectively. It is assumed that the reference intensity is uniform on the detector array and much stronger than the scattered object intensity. As an example, FIG. 10 shows a single electrical interference signal before signal processing, and the corresponding voltage applied to the piezo translator (ref. 75 in FIG. 4B).

Figure 11:
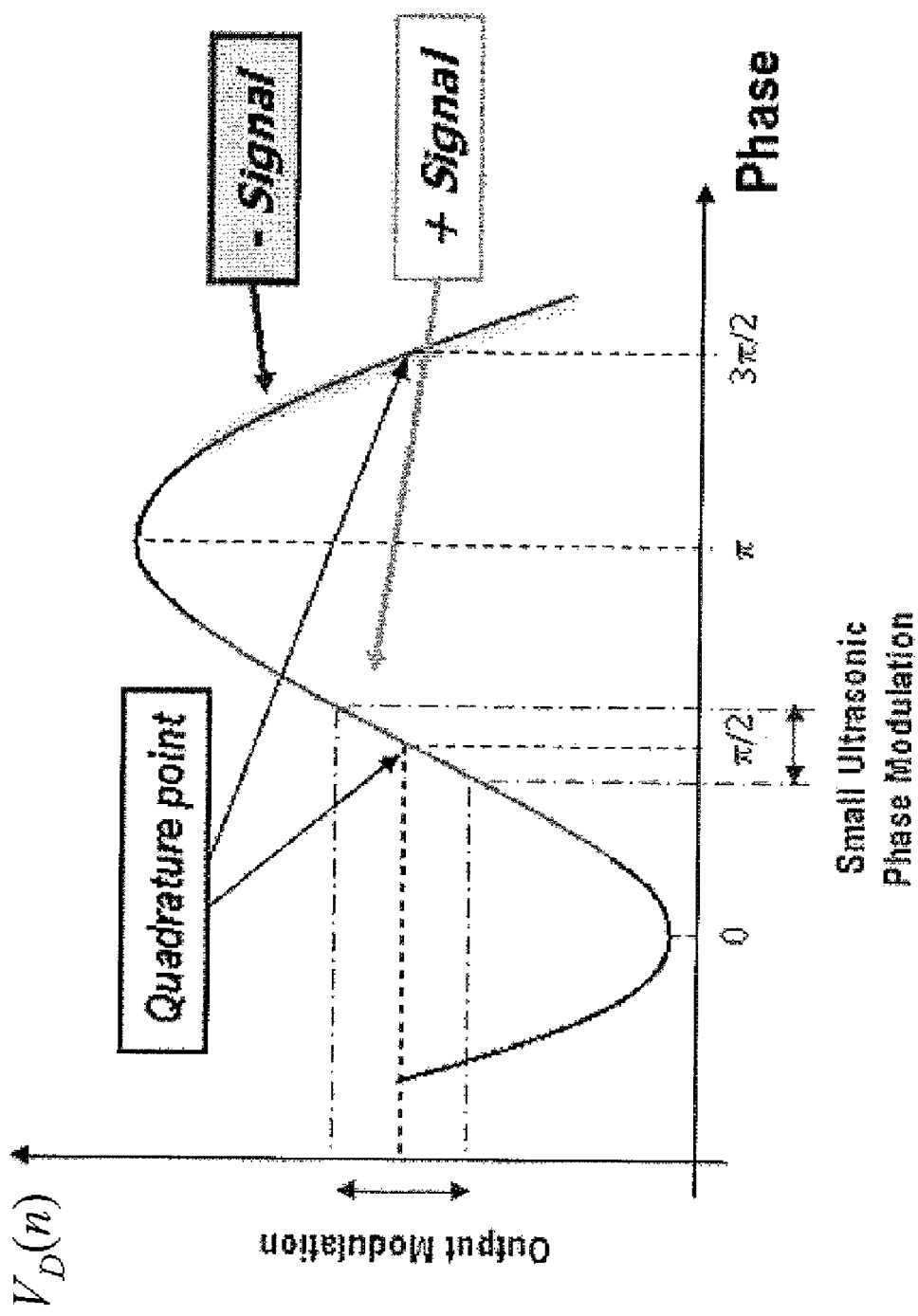
FIG. 11 schematically shows an example of an electrical interference signal (transfer function) of the interferometric apparatus according to embodiments disclosed herein.

A sign ambiguity is due to the transfer function of the interferometric apparatus, i.e., the electrical interference signal $V_D(n)$. As shown in FIG. 11, depending on the phase $\varphi_{LF}(t) + 2\pi f_D t$, the transfer function can be assumed to be linear with either a positive ($\varphi_{LF}(t) + 2\pi f_D t \approx \pi/2$, "+ signal") or a negative slope ($\varphi_{LF}(t) + 2\pi f_D t \approx 3\pi/2$, "- signal"), which leads to the sign ambiguity. In the linear ranges, the interferometric apparatus is said to operate in-quadrature, and the sensitivity of the apparatus with respect to the ultrasonic phase modulation is optimized. Otherwise, the interferometric apparatus operates out-of-quadrature ($\varphi_{LF}(t) + 2\pi f_D t \approx 0$ or $\varphi_{LF}(t) + 2\pi f_D t \approx \pi$) and the sensitivity of the apparatus is near zero.

The sign ambiguity is removed by looking at both the signal and its time derivative. This is done by separating the electrical interference signal into a high-frequency and a low frequency electrical signal, as described above. The high-frequency electrical signal VHF reads $$V_{HF}(n) \propto -2\sqrt{I_{obj(n)}I_{ref}} \sin[\varphi_{LF}(t,n) + 2\pi f_D t] \cdot \varphi_{UT}(t), \quad (2)$$

and the low-frequency electrical signal $V_{LF}$ reads $$V_{LF}(n) \propto I_{ref} + \sqrt{I_{obj(n)}I_{ref}} \cos[\varphi_{LF}(t,n) + 2\pi f_D t]. \quad (3)$$

The time derivative of the low-frequency signal $V_{LF}$ is then carried out using the derivator circuit. The time derivative can be expressed as $$\frac{\partial(V_{LF}(n))}{\partial t} \propto \quad (4)$$

$$-2\sqrt{I_{obj(n)}I_{ref}} \cdot \left(2\pi f_D + \frac{\partial(\varphi_{LF}(t,n))}{\partial t}\right) \cdot \sin[\varphi_{LF}(t,n) + 2\pi f_D t].$$

After multiplication of the high-frequency electrical signal, Eq. (2), and the time derivative low-frequency electrical signal, Eq. (4), the resulting multiplied signal $V_{Multi}$ is $$V_{Multi}(n) \propto A(n) \cdot \varphi_{UT}(t), \quad (5)$$

with $$A(n) = 4 I_{obj(n)} I_{ref} \cdot \left(2\pi f_D + \frac{\partial(\varphi_{LF}(t,n))}{\partial t}\right) \cdot \sin^2[\varphi_{LF}(t,n) + 2\pi f_D t]. \quad (6)$$

It appears from Eq. (6) that the sign of the transfer function is given by the coefficient A(n) and only depends on the sign of the term $$\left(2\pi f_D + \frac{\partial(\varphi_{LF}(t,n))}{\partial t}\right).$$

Thus, due to the application of the Doppler frequency shift, the sign of the coefficient A(n) does not fluctuate due to ambient perturbations, and there is no sign ambiguity of the transfer function.

If the Doppler frequency shift is larger than the noise-induced phase perturbation:

$$|f_D| > (1/2\pi) \cdot \left|\frac{\partial(\varphi_{LF}(t,n))}{\partial t}\right|,$$

the sign of the coefficient A(n) does not change and is given by the sign of $f_D$, which depends on the direction of the induced motion.

After summation of all the multiplied signals from all the detector elements n of the detector arrays, the average output signal $V_{out}(t)$ at the output of the summing amplifier is $$V_{Out}(t) \propto \varphi_{UT}(t) \cdot \sum_n A(n) \quad (7)$$

The output signal is proportional to the small ultrasonic phase of interest and is thus indicative of the displacement of the object's surface. No stabilized quadrature detection scheme is required.

The linear system relies on the random nature of the speckled light. If a sufficient number of independent speckled multiplied signals are summed, it can be assumed that the resulting output signal corresponds to 50% of in-quadrature signals and 50% of out-of-quadrature signals. Summation over a large number of multiplied signals leads to $$\sum_n \sin^2(\varphi_{LF}(t,n) + 2\pi f_D t) \to \frac{n}{2} \text{ and} \quad (8)$$

$$\sum_n \left(\frac{\partial(\varphi_{LF}(t,n))}{\partial t}\right) \to 0.$$

Thus, summation over a large number of elements n leads to a stable output signal where $$\sum_n A(n) \to Const = 4I_{obj(n)}I_{ref}\pi f_D. \quad (9)$$

From Eq. (9), it appears that the constant term, i.e., the output signal, is proportional to the Doppler shift, $f_D$. In-quadrature signals (positive or negative) is detected if the condition $$[2\pi f_D t + \varphi_{LF}(t, n)] = \frac{\pi}{2} + k\pi$$

is fulfilled, leading to a full strength signal at the output of the detector. Out-of-quadrature signals are detected if $[2\pi f_D t + \varphi_{LF}(t,n)]=k\pi$, where k is a natural number. Then the signal at the output of the multiplier is $V_{Mult}(n)=0$, and thus, it does not contribute to the output signal of interest. Only the in-quadrature signals are used for generating the stable output signal.

FIG. 8 illustrates the processing circuit 40 according to second preferred embodiment of the present disclosure, in which the sign correction is performed with digital circuitry. The high-frequency ultrasonic signal 103 is separated in two signals: a direct electrical signal 114 and an inverted electrical signal 115 using amplifiers 112, 113. The time-derivative Doppler signal 107 is converted to a binary signal by the comparator 118. The resulting logic signal 119 controls the multiplexer 116, selecting between the signal 114 and the inverted signal 115. The multiplexed signal 117 and the other multiplexed signals originating from the other channels then enter a summing amplifier 110, where they are added to produce an average output signal 111 that is indicative of the displacement of the surface of the object.

FIG. 9 shows of variant of the second embodiment of the processing circuit shown in FIG. 8. The logic signal 119 controls the switch 120, which roots the high-frequency electrical signal 103 toward an inverting path 121 or a non-inverting path 122. All the high-frequency electrical signals from the negative path 121 are summed by a first summing amplifier 123, thereby producing a first output signal 126. The first output signal 126 is then sent to the inverting input of an output differential amplifier 127. All the high-frequency electrical signals from the positive path 122 are summed by a second summing amplifier 124, thereby producing a second output signal 125. The second output signal 125 is then sent to the summing input of the output differential amplifier 127. The first and second output signals 126, 125 are then subtracted from each other by the output differential amplifier, thereby producing an average output signal 111 that is indicative of the displacement of the surface of the object.

In the embodiments of the processing circuit shown in FIGS. 7, 8, and 9, the high-pass filter 102 is disposed in each channel, i.e., behind each detector element 129. However, in some embodiments, the high-pass filter 102 may also be placed at the output, i.e., in the output signal 111 after the summing amplifier 110 (FIGS. 7 and 8), or after the output differential amplifier 127 (FIG. 9). In this case, only one high-pass filter 102 is used for one detector array.

Furthermore, in the embodiments as shown in FIGS. 7, 8, and 9, the derivator 106 may comprise a first-order high-pass filter inducing a 90° phase difference between its input and output signals. The first-order high-pass filter has a cut-off frequency that is much greater than the frequency shift. For example, if the frequency shift is around 20 kHz, the cut-off frequency may be around 200 kHz. One of ordinary skill in the art would appreciate that other values for the frequency shift and the cut-off frequency may be chosen as long as phase difference induced by the filter is around 90°.

Figure 12:
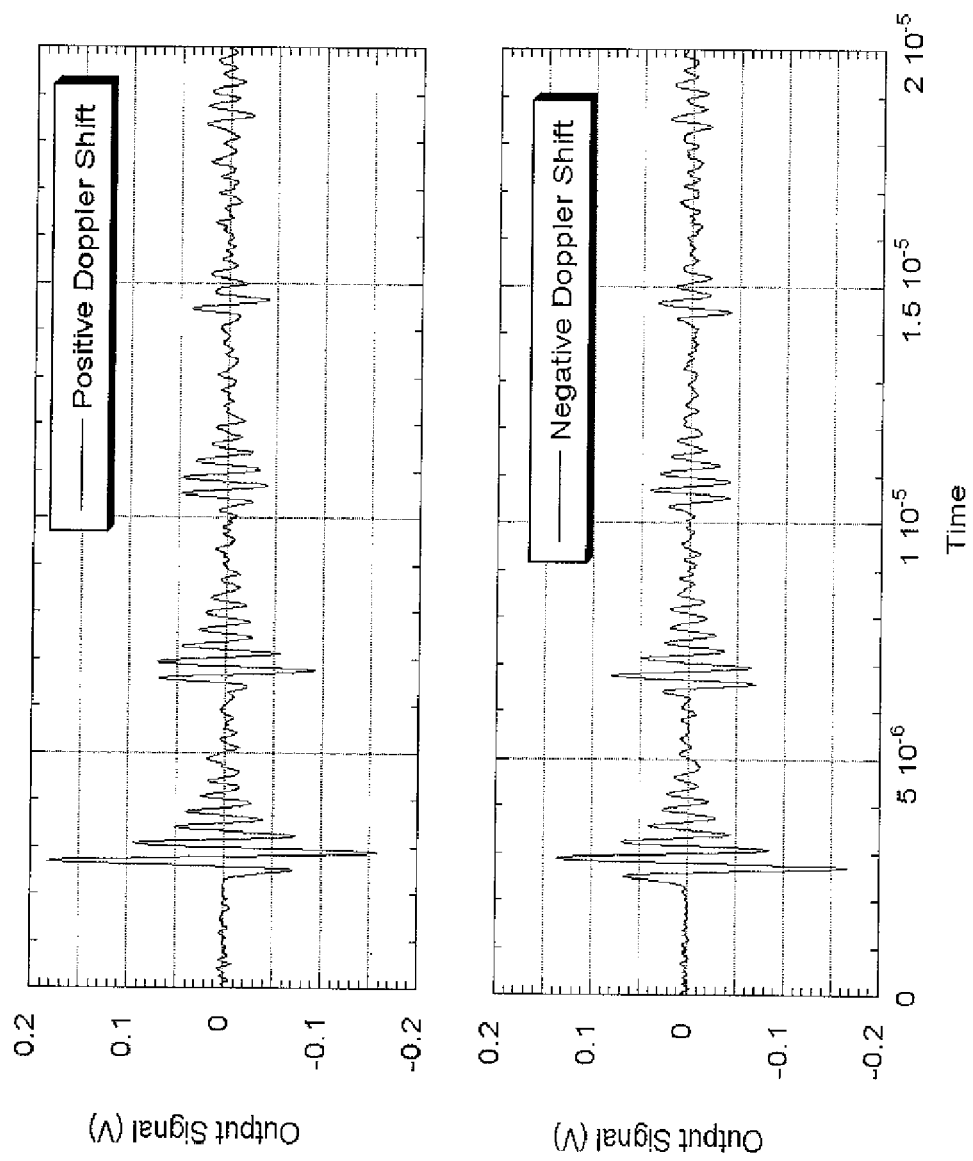
FIG. 12 shows a processed output signal corresponding to an object's surface displacement.

FIG. 12 shows an example of small ultrasonic signals from surface motion detected and processed with an interferometric apparatus and a linear demodulation scheme according to embodiments disclosed herein. Two detector arrays were used, each comprising 25 detector elements. The two signals correspond to the same ultrasonic surface displacement, whereby the first signal results from a positive Doppler shift, and the second signal results from a negative Doppler shift. A positive or negative Doppler shift results, for example, from the different directions of the mirror motion in the apparatus shown in FIG. 4B (mirror 31). This leads to either a positive or a negative output signal.

Advantageously, apparatus and methods of the present disclosure may provide at least one of the following advantages.

The linear detection scheme according to embodiments disclosed herein exhibits near ideal sensitivity. Very small signals may be detected, whereby the signals are proportional to the surface motion of the object. The linear detection scheme also provides for the knowledge of the direction of the surface displacement, and it is adapted to be used with a large range of ultrasonic frequencies.

Specifically, using frequency shifting with acousto-optic modulators (first embodiment shown in FIG. 4A) allows for continuous detection of surface displacements. The apparatus according to the second embodiment, comprising the piezo translator and shown in FIG. 4B, is very easy to implement. Furthermore, the third embodiment (shown in FIG. 5) allows for "on-line" measurements, which are desirable for industrial application, since the object passing by the interferometric apparatus does not have to be stopped or slowed down. A known transverse velocity of the object is thereby set by the manufacturing process. Furthermore, in the first embodiment of the processing circuit as shown in FIG. 7, the out-of-quadrature signal, which does not carry the ultrasonic information and only contributes to the noise, is reduced to zero. This leads to an optimized signal-to-noise ratio.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for detecting surface motion of an object subject to ultrasound, the method comprising:
   generating a laser beam;
   dividing the laser beam into a reference beam and an object beam to be directed onto the surface, thereby producing a scattered object beam;
   introducing a frequency shift between the reference beam and the scattered object beam, wherein the frequency shift is smaller than the ultrasonic frequency;
   detecting the interference between the scattered object beam and the frequency shifted reference beam using a plurality of detecting elements to generate a plurality of electrical interference signals, wherein the electrical interference signals each comprise a wanted signal component indicative of the surface motion and a noise signal component; and
   processing the electrical interference signals to determine the surface motion of the object.

2. The method according to claim 1, wherein the frequency shift is comprised between 1 kHz and 1 MHz and preferably between 10 kHz and 100 kHz.

3. The method according to claim 2, wherein the processing comprises:
- separating each of the electrical interference signals into a high-frequency electrical signal and a low-frequency electrical signal, whereby the high-frequency electrical signal comprises the wanted signal component;
- obtaining the time derivative of the low-frequency electrical signal; and
- deriving the wanted signal component from the high-frequency electrical signal and the time derivative of the low-frequency electrical signal.

4. The method according to claim 3, wherein the deriving comprises:
- multiplying the high-frequency signal with the time derivative of the low-frequency signal to obtain a resulting multiplied signal for each electrical interference signal; and
- summing the resulting multiplied signals to obtain an average output signal comprising substantially the wanted signal component.

5. The method according to claim 3, wherein the deriving comprises:
- separating each of the high-frequency electrical signals in a direct electrical signal and an inverted electrical signal;
- converting the time derivative of the low-frequency electrical signal to a binary logic signal;
- selecting between the direct electrical signal and the inverted electrical signal using the binary logic signal to obtain a multiplexed electrical signal for each electrical interference signal; and
- summing the multiplexed electrical signals to obtain an average output signal comprising substantially the wanted signal component.

6. The method according to claim 3, wherein the deriving comprises:
- converting the time derivative of the low-frequency electrical signal to a binary logic signal;
- rooting the high-frequency electrical signals toward either a non-inverting path or an inverting path using the binary logic signal;
- summing the high-frequency electrical signals rooted to the non-inverting path and summing the high-frequency electrical signals rooted to the inverting path to obtain a first output signal and a second output signal, respectively; and
- subtracting the first and the second output signal to obtain an average output signal comprising substantially the wanted signal component.

7. The method according to claim 3, wherein obtaining the time derivative of the low-frequency electrical signal comprises high-pass filtering of the low-frequency electrical signal.

8. The method according to claim 3, wherein separating the electrical interference signal comprises high-pass filtering and low-pass filtering of the electrical interference signal.

9. A method for detecting surface motion of an object subject to ultrasound, the method comprising:
- generating a laser beam;
- dividing the laser beam into a reference beam and an object beam to be directed onto the surface, wherein the normal on the surface of the object has an angle with the object beam, thereby producing a frequency shifted scattered object beam, wherein the frequency shift is smaller than the ultrasonic frequency, wherein the object is in transverse motion with respect to the object beam;
- detecting the interference between the scattered object beam and the frequency shifted reference beam using a plurality of detecting elements to generate a plurality of electrical interference signals, wherein the electrical interference signals each comprise a wanted signal component indicative of the surface motion and a noise signal component; and
- processing the electrical interference signals to determine the surface motion of the object.

10. The method according to claim 9, wherein the frequency shift is comprised between 1 kHz and 1 MHz and preferably between 10 kHz and 100 kHz.

11. The method according to claim 10, wherein the processing comprises:
- separating each of the electrical interference signals into a high-frequency electrical signal and a low-frequency electrical signal, whereby the high-frequency electrical signal comprises the wanted signal component;
- obtaining the time derivative of the low-frequency electrical signal; and
- deriving the wanted signal component from the high-frequency electrical signal and the time derivative of the low-frequency electrical signal.

12. The method according to claim 10, wherein the deriving comprises:
- multiplying the high-frequency signal with the time derivative of the low-frequency signal to obtain a resulting multiplied signal for each electrical interference signal; and
- summing the resulting multiplied signals to obtain an average output signal comprising substantially the wanted signal component.

13. The method according to claim 10, wherein the deriving comprises:
- separating each of the high-frequency electrical signals in a direct electrical signal and an inverted electrical signal;
- converting the time derivative of the low-frequency electrical signal to a binary logic signal;
- selecting between the direct electrical signal and the inverted electrical signal using the binary logic signal to obtain a multiplexed electrical signal for each electrical interference signal; and
- summing the multiplexed electrical signals to obtain an average output signal comprising substantially the wanted signal component.

14. The method according to claim 10, wherein the deriving comprises:
- converting the time derivative of the low-frequency electrical signal to a binary logic signal;
- rooting the high-frequency electrical signals toward either a non-inverting path or an inverting path using the binary logic signal;
- summing the high-frequency electrical signals rooted to the non-inverting path and summing the high-frequency electrical signals rooted to the inverting path to obtain a first output signal and a second output signal, respectively; and
- subtracting the first and the second output signal to obtain an average output signal comprising substantially the wanted signal component.

15. The method according to claim 10, wherein obtaining the time derivative of the low-frequency electrical signal comprises high-pass filtering of the low-frequency electrical signal.

16. The method according to claim 10, wherein separating the electrical interference signal comprises high-pass filtering and low-pass filtering of the electrical interference signal.

17. A laser interferometric apparatus for detecting surface motion of an object subject to ultrasound, the apparatus comprising:
  a laser source for producing a laser beam;
  a beam splitter for dividing the laser beam into a reference beam and an object beam to be directed onto the surface, thereby producing a scattered object beam;
  a frequency shifting element for introducing a frequency shift between the reference beam and the scattered object beam, wherein the frequency shift is smaller than the ultrasonic frequency;
  a detector with a plurality of detector elements for detecting the interference between the scattered object beam and the reference beam, resulting in a plurality of electrical interference signals each comprising a wanted signal component indicative of the surface motion and a noise signal component; and
  a processing unit for determining the surface motion of the object from the plurality of electrical interference signals.

18. The apparatus according to claim 17, further comprising a beam combiner for generating the interference between the scattered object beam and the reference beam on the detector.

19. The apparatus according to claim 18, further comprising a second detector with a plurality of detector elements, wherein the beam combiner generates the interference between the scattered object beam and the reference beam on each of the detectors.

20. The apparatus according to claim 17, further comprising a multimode optical fiber into which the laser beam is coupled, wherein the beam splitter comprises an end facet of the multimode optical fiber and the interference between the scattered object beam and the reference beam is generated within the fiber.

21. The apparatus according to claim 17, wherein the processing unit comprises:
  one or a plurality of filters for separating the electrical interference signals of each channel into a high-frequency electrical signal and a low-frequency electrical signal, whereby the high-frequency electrical signal comprises the wanted signal component; and
  a derivator for obtaining the time derivative of the low-frequency electrical signal.

22. The apparatus according to claim 21, wherein the processing unit further comprises:
  a multiplier for multiplying the high-frequency signal with the time derivative of the low-frequency signal to obtain a resulting multiplied signal for each channel; and
  a summing amplifier for summing resulting multiplied signals of the channels to obtain an average output signal comprising substantially the wanted signal component.

23. The apparatus according to claim 21, wherein the processing unit further comprises:
  one or a plurality of amplifiers for separating the high-frequency electrical signals of each channel in a direct electrical signal and an inverted electrical signal;
  a comparator for converting the time derivative of the low-frequency electrical signal to a binary logic signal;
  a switch for selecting between the direct electrical signal and the inverted electrical signal using the binary logic signal to obtain a multiplexed electrical signal; and
  a summing amplifier for summing the multiplexed electrical signals of the channels to obtain an average output signal comprising substantially the wanted signal component.

24. The apparatus according to claim 21, wherein the processing unit further comprises:
  a comparator for converting the time derivative of the low-frequency electrical signal to a binary logic signal;
  a switch for rooting the high-frequency electrical signals toward either a non-inverting path or an inverting path using the binary logic signal;
  a summing amplifier for summing the high-frequency electrical signals rooted to the non-inverting path and a summing amplifier for summing the high-frequency electrical signals rooted to the inverting path to obtain a first output signal and a second output signal, respectively; and
  a differential amplifier for subtracting the first and the second output signal to obtain an average output signal comprising substantially the wanted signal component.

25. The apparatus according to claim 21, wherein the derivator comprises a first-order high-pass filter.

26. The apparatus according to claim 17, wherein the frequency shifting element comprises at least one selected from the group consisting of at least two acousto-optic modulators disposed in the reference beam and a Piezo mirror disposed in the reference beam.

27. The apparatus according to claim 20, wherein the frequency shifting element comprises at least one selected from the group consisting of a piezo cylinder attached to an end of the multimode optical fiber and a voice coil system attached to an end of the multimode optical fiber.

28. A laser interferometric apparatus for detecting surface motion of an object subject to ultrasound, the apparatus comprising:
  a laser source for producing a laser beam;
  a beam splitter for dividing the laser beam into a reference beam and an object beam to be directed onto the object/surface, wherein the normal on the surface of the object has an angle with the object beam, thereby producing a frequency shifted scattered object beam, wherein the frequency shift is smaller than the ultrasonic frequency, wherein the object is in transverse motion with respect to the object beam;
  a detector for detecting the interference between the scattered object beam and the reference beam, resulting in a plurality of electrical interference signals each comprising a wanted signal component indicative of the surface motion and a noise signal component, the electrical interference signals each defining a channel; and
  a processing unit for determining the surface motion of the object from the plurality of electrical interference signals.

29. The apparatus according to claim 28, further comprising a beam combiner for generating the interference between the scattered object beam and the reference beam on the detector.

30. The apparatus according to claim 29, further comprising a second detector with a plurality of detector elements, wherein the beam combiner generates the interference between the scattered object beam and the reference beam on each of the detectors.

31. The apparatus according to claim 28, further comprising a multimode optical fiber into which the laser beam is coupled, wherein the beam splitter comprises an end facet of the multimode optical fiber and the interference between the scattered object beam and the reference beam is generated within the fiber.

32. The apparatus according to claim 28, wherein the processing unit comprises:
one or a plurality of filters for separating the electrical interference signals of each channel into a high-frequency electrical signal and a low-frequency electrical signal, whereby the high-frequency electrical signal comprises the wanted signal component; and
a derivator for obtaining the time derivative of the low-frequency electrical signal.

33. The apparatus according to claim 32, wherein the processing unit further comprises:
a multiplier for multiplying the high-frequency signal with the time derivative of the low-frequency signal to obtain a resulting multiplied signal for each channel; and
a summing amplifier for summing resulting multiplied signals of the channels to obtain an average output signal comprising substantially the wanted signal component.

34. The apparatus according to claim 32, wherein the processing unit further comprises:
one or a plurality of amplifiers for separating the high-frequency electrical signals of each channel in a direct electrical signal and an inverted electrical signal;
a comparator for converting the time derivative of the low-frequency electrical signal to a binary logic signal;
a switch for selecting between the direct electrical signal and the inverted electrical signal using the binary logic signal to obtain a multiplexed electrical signal; and
a summing amplifier for summing the multiplexed electrical signals of the channels to obtain an average output signal comprising substantially the wanted signal component.

35. The apparatus according to claim 32, wherein the processing unit further comprises:
a comparator for converting the time derivative of the low-frequency electrical signal to a binary logic signal;
a switch for rooting the high-frequency electrical signals toward either a non-inverting path or an inverting path using the binary logic signal;
a summing amplifier for summing the high-frequency electrical signals rooted to the non-inverting path and a summing amplifier for summing the high-frequency electrical signals rooted to the inverting path to obtain a first output signal and a second output signal, respectively; and
a differential amplifier for subtracting the first and the second output signal to obtain an average output signal comprising substantially the wanted signal component.

36. The apparatus according to claim 32, wherein the derivator comprises a first-order high-pass filter.

* * * * *